US011054578B2

(12) United States Patent
Uchida et al.

(10) Patent No.: US 11,054,578 B2
(45) Date of Patent: Jul. 6, 2021

(54) CROSS OPTICAL WAVEGUIDE STRUCTURE AND OPTICAL WAVEGUIDE DEVICE

(71) Applicant: FURUKAWA ELECTRIC CO., LTD., Tokyo (JP)

(72) Inventors: Yasuyoshi Uchida, Tokyo (JP); Junichi Hasegawa, Tokyo (JP)

(73) Assignee: FURUKAWA ELECTRIC CO., LTD., Tokyo (JP)

(*) Notice: Subject to any disclaimer, the term of this patent is extended or adjusted under 35 U.S.C. 154(b) by 0 days.

(21) Appl. No.: 16/506,768

(22) Filed: Jul. 9, 2019

(65) Prior Publication Data

US 2019/0331852 A1 Oct. 31, 2019

Related U.S. Application Data

(63) Continuation of application No. PCT/JP2018/000799, filed on Jan. 15, 2018.

(30) Foreign Application Priority Data

Jan. 17, 2017 (JP) .............................. JP2017-006053

(51) Int. Cl.
*G02F 1/01* (2006.01)
*G02B 6/00* (2006.01)
(Continued)

(52) U.S. Cl.
CPC ............ *G02B 6/125* (2013.01); *G02B 6/1228* (2013.01)

(58) Field of Classification Search
CPC ... G02F 1/01708; G02F 2202/108; G02F 6/00
(Continued)

(56) References Cited

U.S. PATENT DOCUMENTS 4,961,619 A * 10/1990 Hernandez-Gil .... G02B 6/2804
385/130
5,157,756 A * 10/1992 Nishimoto ............. G02B 6/125
385/129
(Continued)

FOREIGN PATENT DOCUMENTS

JP 2-266334 10/1990
JP 5-60929 3/1993
(Continued)

OTHER PUBLICATIONS

International Search Report dated Apr. 17, 2018 in PCT/JP2018/000799 filed Jan. 15, 2018 (with English Translation).
(Continued)

*Primary Examiner* — Kaveh C Kianni
(74) *Attorney, Agent, or Firm* — Oblon, McClelland, Maier & Neustadt, L.L.P.

(57) ABSTRACT

A cross optical waveguide structure includes a first optical waveguide, a second optical waveguide, and an intersection portion positioned in the same plane. The first optical waveguide includes a first fixed-width portion, a second fixed-width portion, a first tapering portion, and a second tapering portion. The second optical waveguide includes a third fixed-width portion, a fourth fixed-width portion, a third tapering portion, and a fourth tapering portion. The intersection portion is linked to the first to the fourth tapering portions having such a tapering shape that a mode field radius of the light input to the first fixed-width portion, the second fixed-width portion, or the third fixed-width portion, and the fourth fixed-width portion is reduced by the first tapering portion, the second tapering portion, the third tapering portion, the fourth tapering portion, respectively, and the light is collected in the intersection portion.

5 Claims, 9 Drawing Sheets

(51) Int. Cl.
*G02B 6/125* (2006.01)
*G02B 6/122* (2006.01)

(58) Field of Classification Search
USPC .......................................................... 385/123
See application file for complete search history.

(56) References Cited

U.S. PATENT DOCUMENTS

| | | | | |
|---|---|---|---|---|
| 5,297,233 | A * | 3/1994 | Lerminiaux | G02B 6/125 385/27 |
| 5,894,535 | A * | 4/1999 | Lemoff | G02B 6/125 385/14 |
| 5,911,018 | A * | 6/1999 | Bischel | G02F 1/011 385/11 |
| 6,061,487 | A * | 5/2000 | Toyama | G02F 1/3137 385/47 |
| 6,438,279 | B1 * | 8/2002 | Craighead | G02B 6/136 356/246 |
| 6,915,047 | B1 * | 7/2005 | Mekis | G02B 6/125 385/14 |
| 7,263,247 | B1 * | 8/2007 | Hehlen | G02B 6/126 385/14 |
| 7,603,016 | B1 * | 10/2009 | Soref | B82Y 20/00 385/129 |
| 9,709,738 | B1 * | 7/2017 | Dumais | G02B 6/14 |
| 9,995,877 | B2 * | 6/2018 | Nakamura | G02B 6/125 |
| 2002/0154863 | A1 | 10/2002 | Mizuno et al. | |
| 2003/0118286 | A1 * | 6/2003 | Kamei | G02B 6/1228 385/37 |
| 2004/0126052 | A1 * | 7/2004 | Kamei | G02B 6/12011 385/14 |
| 2004/0151423 | A1 * | 8/2004 | Izhaky | G02B 6/1228 385/21 |
| 2004/0190830 | A1 * | 9/2004 | Rasras | G02B 6/125 385/39 |
| 2006/0023989 | A1 * | 2/2006 | Yanagisawa | G02B 6/2938 385/14 |
| 2006/0104571 | A1 | 5/2006 | Kim et al. | |
| 2006/0133716 | A1 * | 6/2006 | Little | G02B 6/2804 385/14 |
| 2006/0251371 | A1 * | 11/2006 | Schmidt | G01N 21/6454 385/129 |
| 2007/0092193 | A1 * | 4/2007 | Yokino | G02B 6/12007 385/129 |
| 2007/0104422 | A1 * | 5/2007 | Watanabe | G02B 6/12009 385/39 |
| 2009/0142019 | A1 * | 6/2009 | Popovic | G02B 6/10 385/28 |
| 2010/0166363 | A1 * | 7/2010 | Matsuoka | G02B 6/4214 385/14 |
| 2012/0243826 | A1 * | 9/2012 | Sun | G02F 1/3138 385/17 |
| 2013/0243374 | A1 * | 9/2013 | Watanabe | G02B 6/125 385/24 |
| 2014/0140655 | A1 * | 5/2014 | Chakravarty | B82Y 20/00 385/12 |
| 2015/0212268 | A1 * | 7/2015 | Goodwill | G02B 6/124 385/14 |
| 2017/0212304 | A1 * | 7/2017 | Sacher | G02B 6/12002 |
| 2017/0276872 | A1 * | 9/2017 | Nakamura | G02B 6/125 |
| 2017/0299902 | A1 * | 10/2017 | Yu | G02F 1/015 |
| 2018/0217469 | A1 * | 8/2018 | Yu | G02F 1/2257 |
| 2019/0179177 | A1 * | 6/2019 | Rickman | H04B 10/29 |
| 2019/0330482 | A1 * | 10/2019 | Williams | C09D 11/322 |

FOREIGN PATENT DOCUMENTS

| | | |
|---|---|---|
| JP | 6-313817 | 11/1994 |
| JP | 2002-162528 | 6/2002 |
| JP | 2007-148382 | 6/2007 |
| JP | 2011-90223 | 5/2011 |
| JP | 2013-174839 | 9/2013 |
| WO | WO 2012/074134 A1 | 6/2012 |

OTHER PUBLICATIONS

Written Opinion dated Apr. 17, 2018 in PCT/JP2018/000799 filed Jan. 15, 2018.
Japanese Office Action dated Apr. 2, 2019 in Japanese Application 2017-006053 (with English Translation).
Masanori Takahashi et al., "Development of Multicast Switch based on $ZrO_2$—$SiO_2$ High Δ PLC", The Furukawa Electric review, Feb. 2016, vol. 135, pp. 20-24.

* cited by examiner

CROSS OPTICAL WAVEGUIDE STRUCTURE AND OPTICAL WAVEGUIDE DEVICE

CROSS-REFERENCE TO RELATED APPLICATION(S)

This application is a continuation of International Application No. PCT/JP2018/000799, filed on Jan. 15, 2018 which claims the benefit of priority of the prior Japanese Patent Application No. 2017-006053, filed on Jan. 17, 2017, the entire contents of which are incorporated herein by reference.

BACKGROUND

The present disclosure relates to a cross optical waveguide structure and relates to an optical waveguide device that includes the cross optical waveguide structure.

Among the optical devices uses in optical communication, some optical devices include an optical waveguide device that has a planar lightwave circuit (PLC) made of silica based glass. In some optical waveguide devices, a cross optical waveguide structure is adopted in which two optical waveguides intersect in the same plane (refer to "Development of Multicast Switch based on $ZrO_2$—$SiO_2$ High Δ PLC" by Masanori Takahashi, Shintaro Yamasaki, Yasuyoshi Uchida, and Junichi Hasegawa in Furukawa Denko Company Times, Vol. 135, (February 2016), pp. 20-24 (in Japanese).

In a cross optical waveguide structure, in the intersection portion of intersection between the optical waveguides, it is known that a loss occurs with respect to the light propagating through the optical waveguides (hereinafter, sometimes called an intersection loss). In that regard, optical waveguide structures meant for reducing such intersection loss have been disclosed (refer to Japanese Laid-open Patent Publication No. 5-60929 and Japanese Laid-open Patent Publication No. 2011-090223).

SUMMARY

According to an aspect of the present disclosure, a cross optical waveguide structure is provided which includes a first optical waveguide; a second optical waveguide that is positioned in a same plane as the first optical waveguide; an intersection portion of intersection between the first optical waveguide and the second optical waveguide; and a cladding portion that is formed on outer periphery of the first optical waveguide and the second optical waveguide, and that has a smaller refractive index than the first optical waveguide, the second optical waveguide, and the intersection portion. The first optical waveguide includes a first fixed-width portion, a second fixed-width portion, a first tapering portion that extends from the first fixed-width portion toward the second fixed-width portion, and a width thereof decreases toward the second fixed-width portion, and a second tapering portion that extends from the second fixed-width portion toward the first fixed-width portion, and a width thereof decreases toward the first fixed-width portion. The second optical waveguide includes a third fixed-width portion, a fourth fixed-width portion, a third tapering portion that extends from the third fixed-width portion toward the fourth fixed-width portion, and a width thereof decreases toward the fourth fixed-width portion, and a fourth tapering portion that extends from the fourth fixed-width portion toward the third fixed-width portion, and a width thereof decreases toward the third fixed-width portion. The intersection portion is linked to the first tapering portion, the second tapering portion, the third tapering portion, and the fourth tapering portion, and the first tapering portion, the second tapering portion, the third tapering portion, and the fourth tapering portion are set to have a tapering shape such that a mode field radius of propagation mode of light input to the first fixed-width portion, the second fixed-width portion, the third fixed-width portion, and the fourth fixed-width portion is reduced by the first tapering portion, the second tapering portion, the third tapering portion, the fourth tapering portion, respectively, and the light is collected in the intersection portion.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION

Exemplary embodiments of the present disclosure are described below in detail with reference to the accompanying drawings. However, the disclosure is not limited by the embodiments described below. In the drawings, identical or corresponding constituent elements are referred to by the same reference numerals. Moreover, each drawing is schematic in nature, and it needs to be kept in mind that the relationships among the dimensions of the elements or the ratio of the elements may be different than the actual situation. Among the drawings, there may be portions having different relationships among the dimensions or having different ratios.

First Embodiment

Figure 1A:
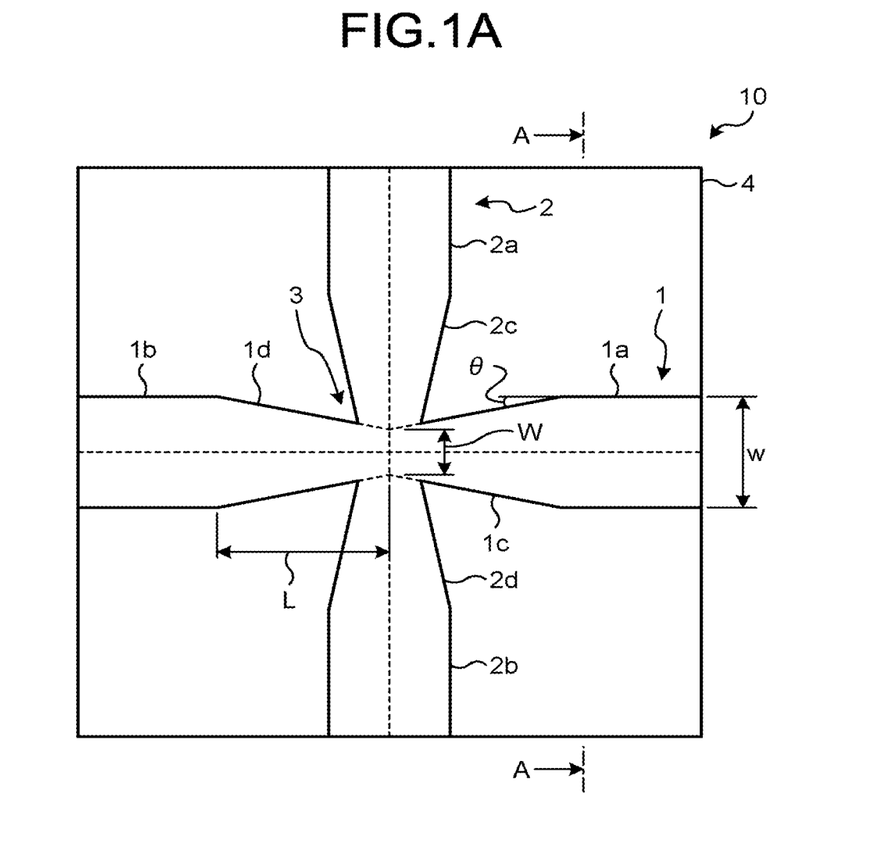
FIG. 1A is a schematic diagram illustrating a cross optical waveguide structure according to a first embodiment.
Figure 1B:
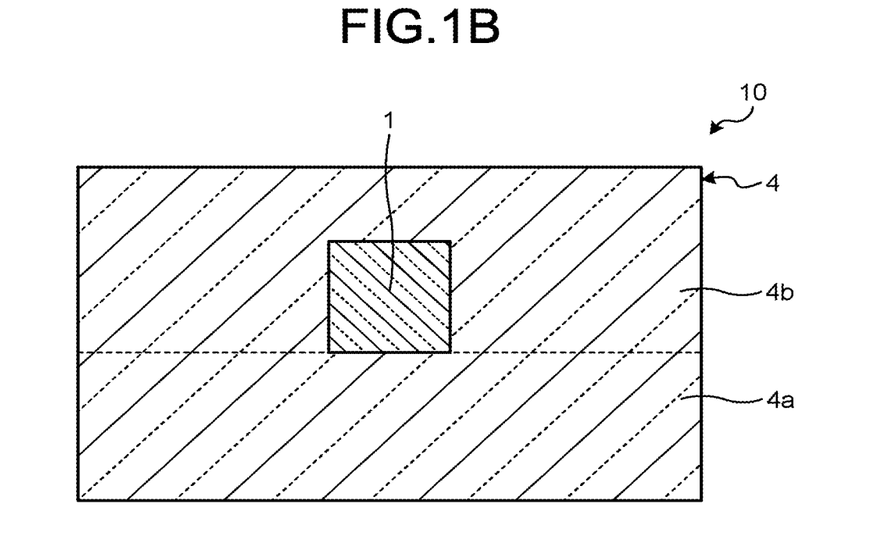
FIG. 1B is a cross-sectional view along A-A line illustrated in FIG. 1A.

FIGS. 1A and 1B are schematic diagrams illustrating a cross optical waveguide structure according to a first embodiment. FIG. 1A is a planar view, and FIG. 1B is a cross-sectional view along A-A line illustrated in FIG. 1A. As illustrated in FIG. 1, a cross optical waveguide structure 10 includes a first optical waveguide 1; a second optical waveguide 2 that is positioned in the same plane as the first optical waveguide 1 and that is orthogonal to the first optical waveguide 1; an intersection portion 3 of intersection between the first optical waveguide 1 and the second optical waveguide 2; and a cladding portion 4 that is formed on the outer periphery of the first optical waveguide 1 and the second optical waveguide 2. The cross optical waveguide structure 10 is designed to suitably propagate, in the single mode, the light having the wavelength of 1.55 µm.

The first optical waveguide 1, the second optical waveguide 2, and the intersection portion 3 are made of silica based glass that includes $GeO_2$, or fine-grained $ZrO_2$, both of which serve as a dopant for enhancing the refractive index. The cladding portion 4 includes a lower cladding layer 4a and an over-cladding portion 4b, and is made of silica based glass having a smaller refractive index than the first optical waveguide 1, the second optical waveguide 2, and the intersection portion 3. As a result, the first optical waveguide 1, the second optical waveguide 2, and the intersection portion 3 function as an optical waveguide for confining and guiding the light. With respect to the cladding portion 4; the first optical waveguide 1, the second optical waveguide 2, and the intersection portion 3 have a relative refractive index difference $\Delta$ of, for example, 1.5% to 10% at the wavelength of 1.55 µm. In the first embodiment, the first optical waveguide 1, the second optical waveguide 2, and the intersection portion 3 have the same relative refractive index difference $\Delta$ at the wavelength of 1.55 µm. Moreover, the first optical waveguide 1, the second optical waveguide 2, and the intersection portion 3 have a cross section of, for example, a square shape, or a rectangle shape, or a trapezoidal shape.

The first optical waveguide 1 includes a first fixed-width portion 1a, a second fixed-width portion 1b, a first tapering portion 1c, and a second tapering portion 1d. The first fixed-width portion 1a and the second fixed-width portion 1b have a fixed width, which is a length along a direction orthogonal to the longitudinal direction thereof. In the first embodiment, the first fixed-width portion 1a and the second fixed-width portion 1b have a same width w. The width w of the first fixed-width portion 1a and the second fixed-width portion 1b is set, taking the relative refractive index difference $\Delta$ into consideration, such that the light having the wavelength of 1.55 µm propagates in the single mode. For example, the width w is set to be in the range of 1.5 µm to 5.5 µm.

The first tapering portion 1c extends from the first fixed-width portion 1a toward the second fixed-width portion 1b, and has a monotonic tapering shape with the width thereof decreasing at a predetermined tapering angle $\theta$ toward the second fixed-width portion 1b. The tapering angle $\theta$ is an angle formed between a line extending in parallel with the optical axis of the first optical waveguide 1 as illustrated by a dashed line and a line extending along an outer edge, which is a boundary between the first tapering portion 1c and the over-cladding portion 4b. The second tapering portion 1d extends from the second fixed-width portion 1b toward the first fixed-width portion 1a, and has a monotonic tapering shape with the width thereof decreasing at a predetermined tapering angle toward the first fixed-width portion 1a. In the first embodiment, the tapering angle of the second tapering portion 1d is the same angle $\theta$ as the tapering angle of the first tapering portion 1c. Moreover, the first tapering portion 1c and the second tapering portion 1d are linked to the intersection portion 3.

Similarly, the second optical waveguide 2 includes a third fixed-width portion 2a, a fourth fixed-width portion 2b, a third tapering portion 2c, and a fourth tapering portion 2d. The third fixed-width portion 2a and the fourth fixed-width portion 2b have a fixed width, which is a length along a direction orthogonal to the longitudinal direction thereof. In the first embodiment, the third fixed-width portion 2a and the fourth fixed-width portion 2b have the same width w as the width of the first fixed-width portion 1a of the first optical waveguide 1.

The third tapering portion 2c extends from the third fixed-width portion 2a toward the fourth fixed-width portion 2b, and has a monotonic tapering shape with the width thereof decreasing at a predetermined tapering angle toward the fourth fixed-width portion 2b. The fourth tapering portion 2d extends from the fourth fixed-width portion 2b toward the third fixed-width portion 2a, and has a monotonic tapering shape with the width thereof decreasing at a predetermined tapering angle toward the third fixed-width portion 2a. In the first embodiment, the tapering angle of the third tapering portion 2c as well as the tapering angle of the fourth tapering portion 2d is the same angle $\theta$ as the tapering angle of the first tapering portion 1c of the first optical waveguide 1. Moreover, the third tapering portion 2c and the fourth tapering portion 2d are linked to the intersection portion 3.

With reference to FIG. 1A, a distance L represents the distance, in the optical axis direction of the first optical waveguide 1, from the point of intersection between the optical axis of the first optical waveguide 1 and the optical axis of the second optical waveguide 2 as illustrated by dashed lines to the linking position of the second tapering portion 1d and the second fixed-width portion 1b. In the first embodiment, since the first tapering portion 1c and the second tapering portion 1d have a symmetrical shape with respect to the optical axis of the second optical waveguide 2, the point of intersection between the two optical axes and the linking position of the first tapering portion 1c and the first fixed-width portion 1a are also separated by the distance L in the optical axis direction of the first optical waveguide 1. Furthermore, when an upper outer edge of the first tapering portion 1c and an upper outer edge of the second tapering portion 1d are extended up to the inside of the intersection portion 3, a point of intersection of those two upper outer edges is positioned on the optical axis of the second optical waveguide 2. Similarly, when a lower outer edge of the first tapering portion 1c and a lower outer edge of the second tapering portion 1d are extended up to the inside of the intersection portion 3, a point of intersection of those two lower outer edges is positioned on the optical axis of the second optical waveguide 2. The distance between the points of intersection is referred to as a width W.

In an identical manner, the distance, in the optical axis direction of the second optical waveguide 2, from the point of intersection between the optical axis of the first optical waveguide 1 and the optical axis of the second optical waveguide 2 to the linking position of the fourth tapering portion 2d and the fourth fixed-width portion 2b is also equal to the distance L. Moreover, since the third tapering portion 2c and the fourth tapering portion 2d have a symmetrical shape with respect to the optical axis of the first optical waveguide 1 as illustrated by a dashed line, the linking position of the third tapering portion 2c and the third fixed-width portion 2a is also separated from the point of intersection between those two optical axes by the distance L in the optical axis direction of the second optical waveguide 2. Furthermore, when the outer edges the third tapering portion 2c and the corresponding outer edges the fourth tapering portion 2d are extended up to the inside of the intersection portion 3, the points of intersection (two points) between those corresponding two outer edges are positioned on the optical axis of the first optical waveguide 1.

Figure 2:
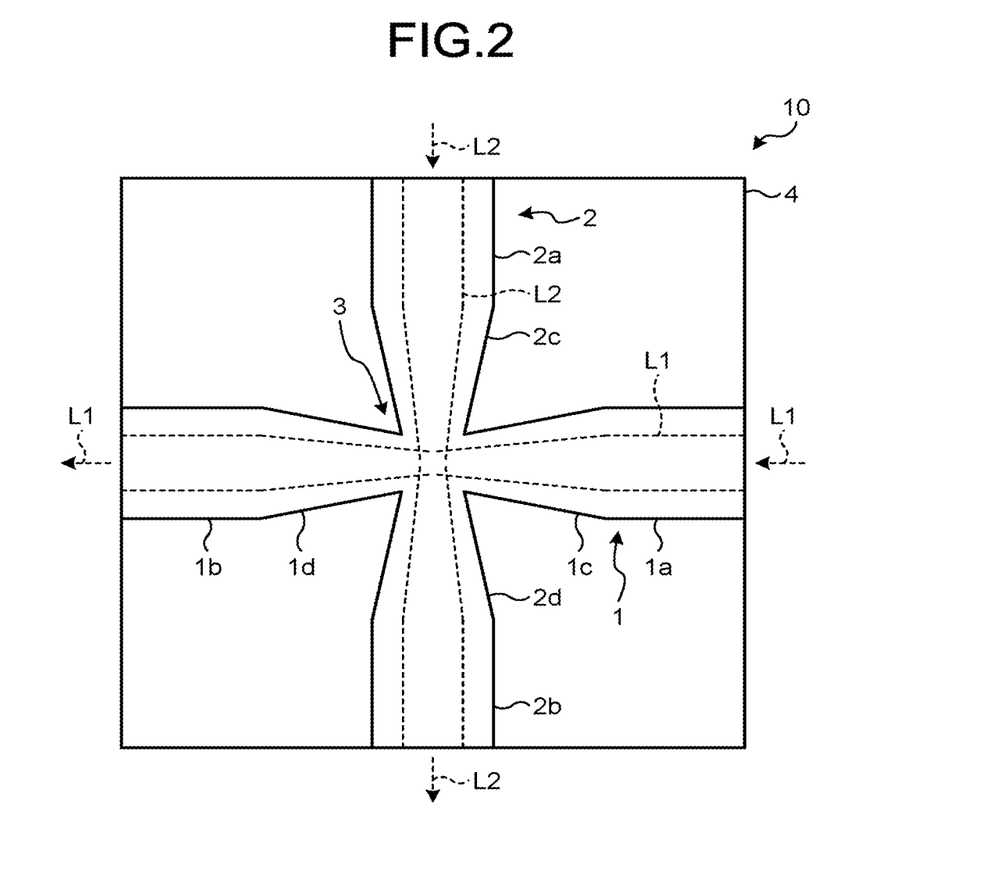
FIG. 2 is a diagram for explaining the propagation state of the light in the cross optical waveguide structure illustrated in FIG. 1.

FIG. 2 is a diagram for explaining the propagation state of the light in the cross optical waveguide structure 10. When a light L1 is input to the first optical waveguide 1 from the first fixed-width portion 1a; firstly, the first fixed-width portion 1a propagates the light L1 as a beam that has the mode field radius based on the propagation mode in accordance with the size and the relative refractive index difference Δ of the first fixed-width portion 1a. Then, the first tapering portion 1c propagates the light L1 in such a way that the mode field radius goes on gradually decreasing, and collects the light L1 near the middle portion of the intersection portion 3 (near the optical axis of the second optical waveguide 2). Subsequently, the second tapering portion 1d propagates the light L1 in such a way that the mode field radius goes on gradually increasing; and the second fixed-width portion 1b propagates the light L1 at the substantially same mode field radius as the mode field radius in the first fixed-width portion 1a, and then outputs the light L1.

In the present written description, the mode field radius implies the distance obtained when, after the light intensity distribution is approximated using a Gaussian function, the light intensity in a radial direction decreases from the maximum value at the central part of the core to a value equal to $1/e^2 = 0.135$ times of the maximum value.

When the light L1 is input from the second fixed-width portion 1b, the second tapering portion 1d propagates the light L1 in such a way that the mode field radius goes on gradually decreasing, and collects the light L1 near the middle portion of the intersection portion 3. Then, the first tapering portion 1c propagates the light L1 in such a way that the mode field radius goes on gradually increasing.

In an identical manner, when a light L2 is input to the second optical waveguide 2 from the third fixed-width portion 2a; firstly, the third fixed-width portion 2a propagates the light L2 as a beam that has the mode field radius based on the propagation mode in accordance with the size and the relative refractive index difference Δ of the third fixed-width portion 2a. Then, the third tapering portion 2c propagates the light L2 in such a way that the mode field radius goes on gradually decreasing, and collects the light L1 near the middle portion of the intersection portion 3. Subsequently, the fourth tapering portion 2d propagates the light L2 in such a way that the mode field radius goes on gradually increasing; and the fourth fixed-width portion 2b propagates the light L2 at the substantially same mode field radius as the mode field radius in the third fixed-width portion 2a, and then outputs the light L2.

When the light L2 is input from the fourth fixed-width portion 2b, the fourth tapering portion 2d propagates the light L2 in such a way that the mode field radius goes on gradually decreasing, and collects the light L2 near the middle portion of the intersection portion 3. Then, the third tapering portion 2c propagates the light L2 in such a way that the mode field radius goes on gradually increasing.

In this way, in the cross optical waveguide structure 10, the intersection of the lights L1 and L2 in the intersection portion 3 occurs in the collected state of the lights L1 and L2 with reduced mode field radii. As a result, it becomes possible to reduce the overlapping range of the mode fields of the lights L1 and L2. That leads to a decrease in the interference between the lights L1 and L2, thereby reducing the intersection loss caused by the interference between the lights L1 and L2 in the intersection portion 3. It means that there is a decrease in the overlapping range of the propagation mode of the first optical waveguide 1 and the propagation mode of the second optical waveguide 2 in the intersection portion 3, thereby leading to a decrease in the interference between the two propagation modes. Hence, the effect of reducing the intersection loss in the intersection portion 3 is demonstrated not only in the case where the light is input to the first optical waveguide 1 and to the second optical waveguide 2, but also in the case where the light is input to only one of the two optical waveguides.

Moreover, in the cross optical waveguide structure 10, since the light is collected within the intersection portion 3, the width of the tapering portions can be increased in comparison with a case where such tapering portions that expand the mode field of the light in the intersection portion. Thus, not only the level of difficulty and the processing accuracy of the processing for forming the tapering portions are reduced, but the manufacturing yield is also enhanced.

Furthermore, in the cross optical waveguide structure 10, the first optical waveguide 1 includes the first tapering portion 1c and the second tapering portion 1d. Hence, in the case in which one of the two tapering portions reduces the mode field radius of the input light and collects the light, the other tapering portion enables increasing the mode field radius of the collected light. As a result, in comparison with a case where the tapering portions that expand the mode field of the light are formed in the intersection portion, it also results in the reduction of the recombination loss between the fixed-width portion linked to one tapering portion and the fixed-width portion linked to the other tapering portion. Regarding the second optical waveguide 2, since it includes the third tapering portion 2c and the fourth tapering portion 2d, the recombination loss can be reduced in an identical manner.

In order to reduce the intersection loss in the cross optical waveguide structure 10; the first tapering portion 1c, the second tapering portion 1d, the third tapering portion 2c, and the fourth tapering portion 2d are set to have shapes such that the mode field radius of propagation mode of the light input to the first fixed-width portion 1a, the second fixed-width portion 1b, the third fixed-width portion 2a, and the fourth fixed-width portion 2b is reduced by the first tapering portion 1c, the second tapering portion 1d, the third tapering portion 2c, and the fourth tapering portion 2d, respectively, and the light is collected in the intersection portion 3.

It is desirable that the first tapering portion 1c has such a tapering shape that the light propagated from the first fixed-width portion 1a has the mode field radius of the propagation mode reduced in an appropriate manner (for example, has the mode field radius changed in a non-adiabatic manner). As a result, the mode field radius of the propagation mode of the light can be exponentially reduced without having to increase the length of the first tapering portion 1c beyond necessity. That enables achieving downsizing of the cross optical waveguide structure 10. Similarly, regarding each of the second tapering portion 1d, the third tapering portion 2c, and the fourth tapering portion 2d; it is desirable that the tapering shapes are set in such a way that the light propagated from the corresponding fixed-width portion has the mode field radius of the propagation mode reduced in an appropriate manner.

As in the first embodiment, when the first tapering portion 1c, the second tapering portion 1d, the third tapering portion 2c, and the fourth tapering portion 2d have a monotonic tapering shape, it is desirable that the tapering angle θ is within the range of 0.5×≤θ≤3×Δ in relationship to the relative refractive index difference Δ. Within that range, it becomes possible to appropriately reduce the mode field radius of the propagation mode of the light, as well as to prevent a situation in which multimode propagation of the light occurs due to excessive exponential variation thereby resulting in propagation loss. Moreover, it is further desirable that the tapering angle θ is within the range of 0.7× Δ≤θ≤1.8×Δ. Thus, when the relative refractive index difference Δ is equal to 1.55%, it is desirable that the tapering angle θ is equal to or greater than 0.8° and equal to or smaller than 4.7°; and it is further desirable that the tapering angle θ is equal to or greater than 1.1° and equal to or smaller than 2.8°. Alternatively, when the relative refractive index difference Δ is equal to 5%, it is desirable that the tapering angle θ is equal to or greater than 2.5° and equal to or smaller than 15°; and it is further desirable that the tapering angle θ is equal to or greater than 3.5° and equal to or smaller than 9°.

Meanwhile, in the first embodiment, each of the first tapering portion 1c, the second tapering portion 1d, the third tapering portion 2c, and the fourth tapering portion 2d has the tapering angle θ, and each tapering portion and the intersection portion have the refractive index difference Δ therebetween. However, if each tapering portion has a different tapering angle, it is desirable to do the settings as given below.

If θ1, θ2, θ3, and θ4 represent the tapering angles of the first tapering portion 1c, the second tapering portion 1d, the third tapering portion 2c, and the fourth tapering portion 2d, respectively; then it is desirable that Equation (1) to Equation (4) given below are satisfied.

$$0.5 \times \Delta \leq \theta 1 \leq 3 \times \Delta \quad (1)$$

$$0.5 \times \Delta \leq \theta 2 \leq 3 \times \Delta \quad (2)$$

$$0.5 \times \Delta \leq \theta 3 \leq 3 \times \Delta \quad (3)$$

$$0.5 \times \Delta \leq \theta 4 \leq 3 \times \Delta \quad (4)$$

It is further desirable that Equation (5) to Equation (8) given below are satisfied.

$$0.7 \times \Delta \leq \theta 1 \leq 1.8 \times \Delta \quad (5)$$

$$0.7 \times \Delta \leq \theta 2 \leq 1.8 \times \Delta \quad (6)$$

$$0.7 \times \Delta \leq \theta 3 \leq 1.8 \times \Delta \quad (7)$$

$$0.7 \times \Delta \leq \theta 4 \leq 1.8 \times \Delta \quad (8)$$

Figure 3:
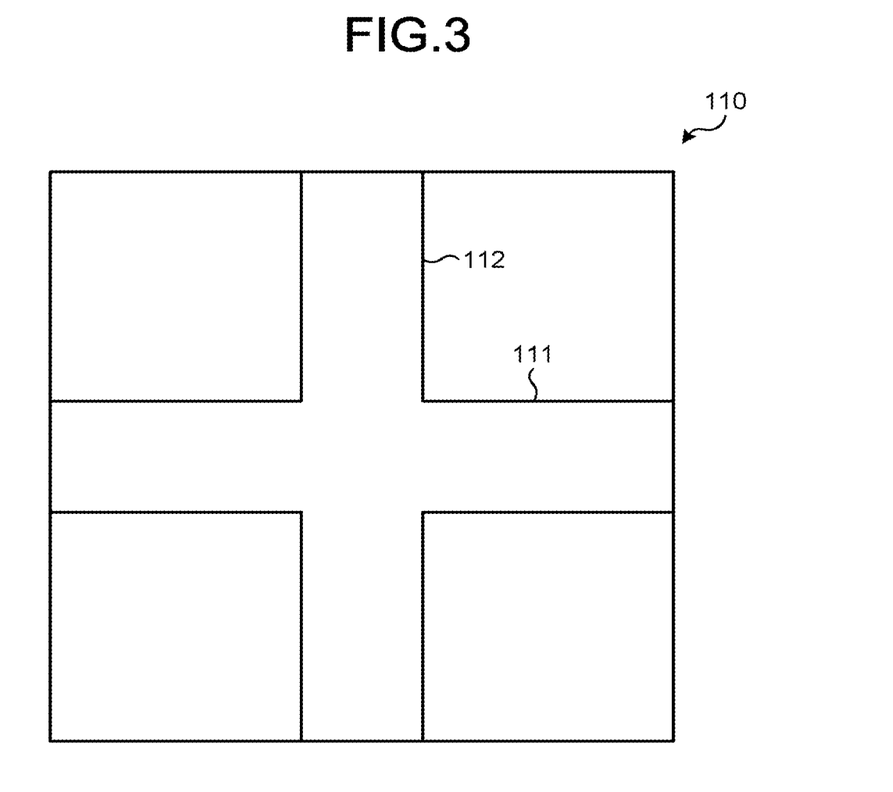
FIG. 3 is a schematic diagram illustrating an optical waveguide structure according to a comparative example.

Regarding the effects achieved in the first embodiment, the following explanation is given with reference to a simulation calculation result. Herein, simulation calculation was performed to check the propagation state of the light in the cross optical waveguide structure 10 according to the first embodiment and to check the propagation state of the light in a cross optical waveguide structure 110 according to a comparative example, in which two fixed-width optical waveguides 111 and 112 as illustrated in FIG. 3.

In the simulation calculation, the wavelength of the light was set to be equal to 1.55 μm. Moreover, regarding the cross optical waveguide structure 10, the relative refractive index difference Δ was set to be equal to 5%, the tapering angle θ illustrated in FIG. 1 was set to be equal to 5°, the width w illustrated in FIG. 1 was set to be equal to 2.6 μm, the width W illustrated in FIG. 1 was set to be equal to 1.2 μm, and the distance L illustrated in FIG. 1 was set to be equal to 4.0 μm. Furthermore, regarding the cross optical waveguide structure 110, the relative refractive index difference between the optical waveguides 111 and 112 was set to be equal to 5%, and the waveguide width of the optical waveguides 111 and 112 was set to be equal to 2.6 μm.

Figure 4A:
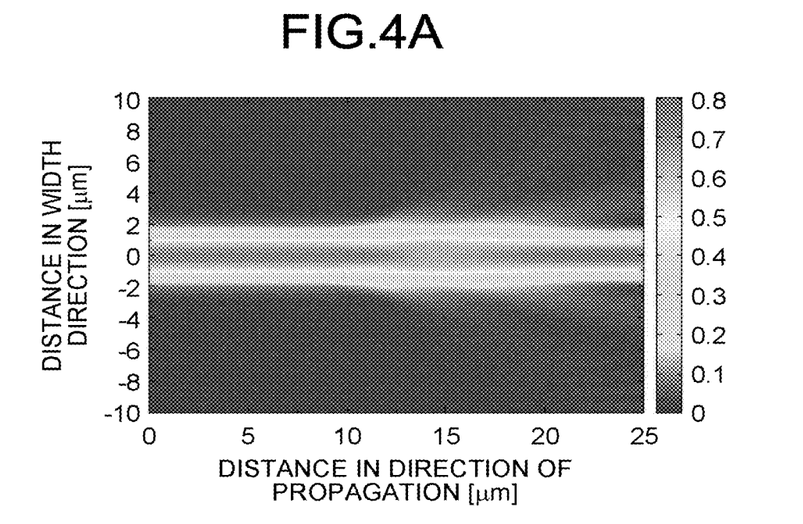
FIG. 4A is a diagram illustrating the propagation state of the light (a comparative example)
Figure 4B:
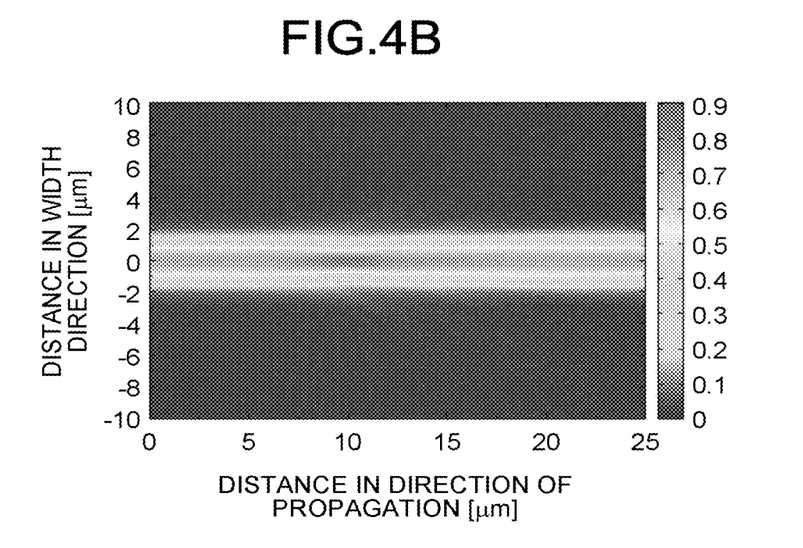
FIG. 4B is a diagram illustrating the propagation state of the light.

FIGS. 4A and 4B are a diagram for explaining the propagation state of the light. FIGS. 4A and 4B illustrate the field distribution of the light, where the horizontal axis represents the propagation distance of the light, and the vertical axis represents the distance from the optical axis in the width direction of the waveguide. The numerical values from 0 to 0.8 indicate the light intensity and the portion of a high numerical value indicates a high light intensity.

In FIG. 4A is illustrated the propagation state of the light in the cross optical waveguide structure 110, and in FIG. 4B is illustrated the propagation state of the light in the cross optical waveguide structure 10. As illustrated in FIG. 4A, in the cross optical waveguide structure 110, there is leakage of light believed to be caused by the interference of the propagation modes in the intersection portion. In contrast, as illustrated in FIG. 4B, in the cross optical waveguide structure 10, the light is collected in the intersection portion and there does not occur any leakage of the light. Thus, it was confirmed that the interference of the propagation modes and the interference-induced intersection loss is supposedly reduced.

Figure 5:
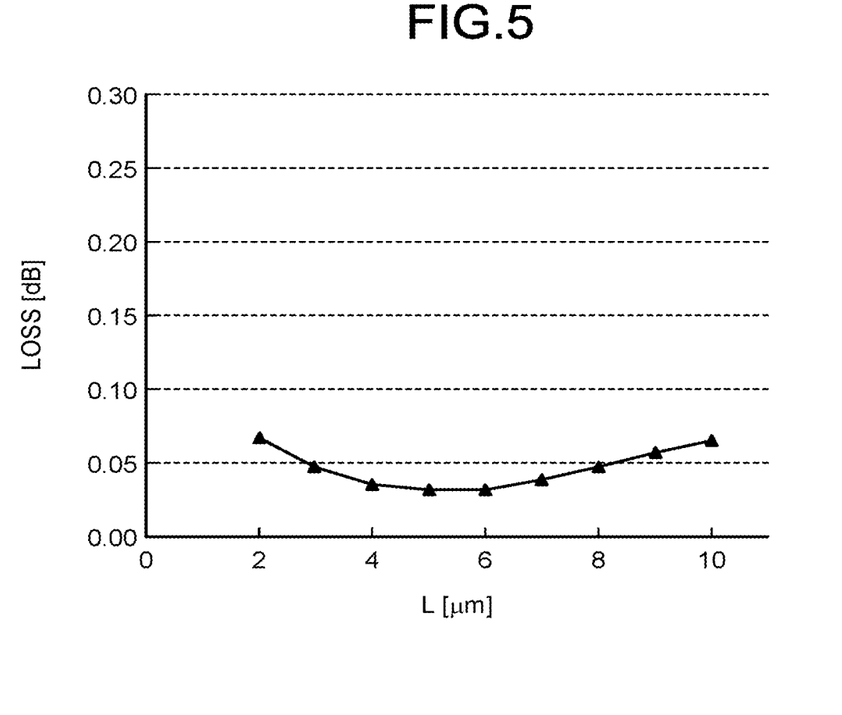
FIG. 5 is a diagram illustrating the relationship between a distance L and an intersection loss.

FIG. 5 is a diagram illustrating the relationship between the distance L and the intersection loss when, in the cross optical waveguide structure 10, the intersection loss is calculated by varying the distance L under the conditions of the simulation calculation illustrated in FIG. 4. As illustrated in FIG. 5, even if the distance L is quintuplicated from 2 μm to 10 μm, it was confirmed that the intersection loss can be held down to 0.1 dB or less within that range of the distance L.

Moreover, regarding the cross optical waveguide structure 10; the wavelength of the light was set to be equal to 1.55 μm, the relative refractive index difference Δ was set to be equal to 5% or 1.55%, and the width w was set to be equal to 2.6 μm. Under those conditions, simulation calculation was performed for the optimum tapering angle θ, the optimum distance L, and the optimum width W that enable minimizing the intersection loss. As a result, when the relative refractive index difference Δ was equal to 5%; the optimum tapering angle θ was equal to 7.97°, the optimum distance L was equal to 5 μm, and the optimum width W was equal to 1.2 μm. In that case, the intersection loss was equal to 0.03 dB. On the other hand, when the relative refractive index difference Δ was equal to 1.55%; the optimum tapering angle θ was equal to 1.14°, the optimum distance L was equal to 25 μm, and the optimum width W was equal to 3.8 μm. In that case, the intersection loss was equal to 0.01 dB.

Second Embodiment

Figure 6:
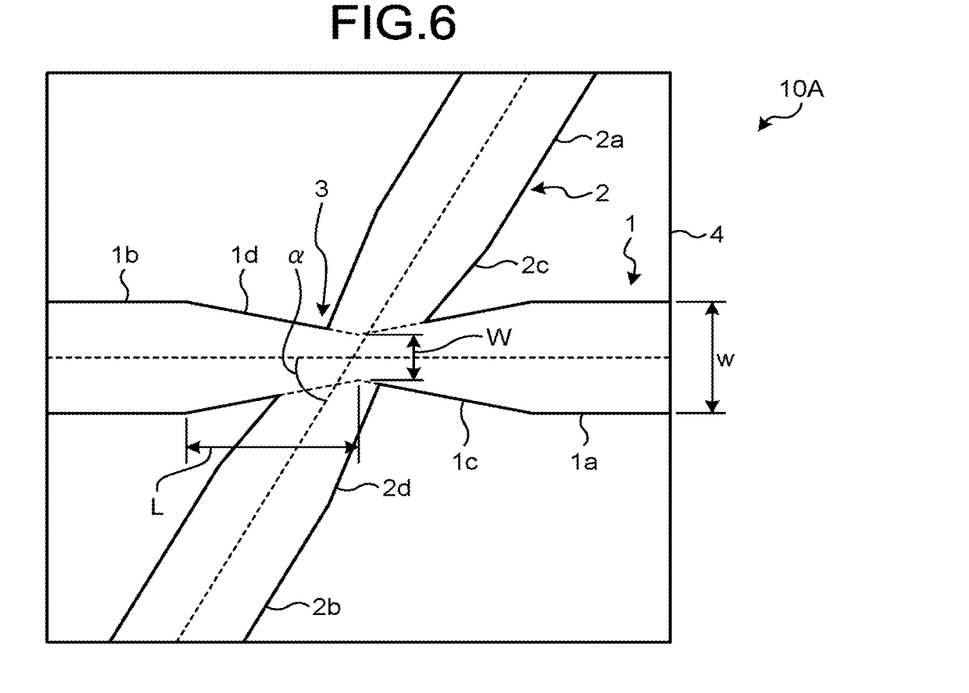
FIG. 6 is a schematic diagram illustrating a cross optical waveguide structure according to a second embodiment.

FIG. 6 is a schematic diagram illustrating a cross optical waveguide structure according to a second embodiment. A cross optical waveguide structure 10A according to the second embodiment is configured in such a way that, in the cross optical waveguide structure 10 according to the first embodiment, the second optical waveguide 2 is inclined with respect to the first optical waveguide 1 at an intersection angle α. The intersection angle is an angle other than 90° and is in the range of 30° to 80°, for example. Namely, a term "cross" in the cross optical waveguide does not necessarily mean that the two optical waveguides intersect with each other as a right angle. Meanwhile, the width w, the width W, and the distance L have the same meaning as the width w, the width W, and the distance L in the cross optical waveguide structure 10.

In this way, it is possible to reduce the intersection loss even when the present disclosure is applied to a structure such as the cross optical waveguide structure 10A in which the second optical waveguide 2 is inclined with respect to the first optical waveguide 1, without limiting to a structure in which the second optical waveguide 2 is orthogonal to the first optical waveguide 1.

Moreover, in the cross optical waveguide structure 10A, the first optical waveguide 1 as well as the second optical waveguide 2 is configured with a fixed-width portion and with a tapering portion that goes on decreasing in width toward an intersection portion. As a result, the intersection angle α between the first optical waveguide 1 and the second optical waveguide 2 can be set to a small angle of, for example, 30° without causing physical interference between the first optical waveguide 1 and the second optical waveguide 2.

Given below is the explanation about the second embodiment with reference to the simulation calculation result. In the cross optical waveguide structure 10A; the intersection loss was calculated by setting the relative refractive index difference Δ to 5% or 1.55%, by setting the tapering angle θ to 5°, and by varying the intersection angle α, the width W, and the distance L as given in Table 1. In an identical manner, in the structure according to the comparative example as illustrated in FIG. 3, the intersection loss was calculated by setting the relative refractive index difference Δ to 5% or 1.55 and by varying the intersection angle as given in Table 1.

TABLE 1

| α [°] | W [μm] | L [μm] |
|---|---|---|
| 90 | 1.2 | 4.0 |
| 80 | 1.4 | 5.0 |
| 70 | 1.4 | 5.0 |
| 60 | 1.2 | 5.0 |
| 50 | 1.2 | 6.0 |
| 40 | 1.2 | 7.0 |
| 30 | 1.2 | 6.0 |

Figure 7A:
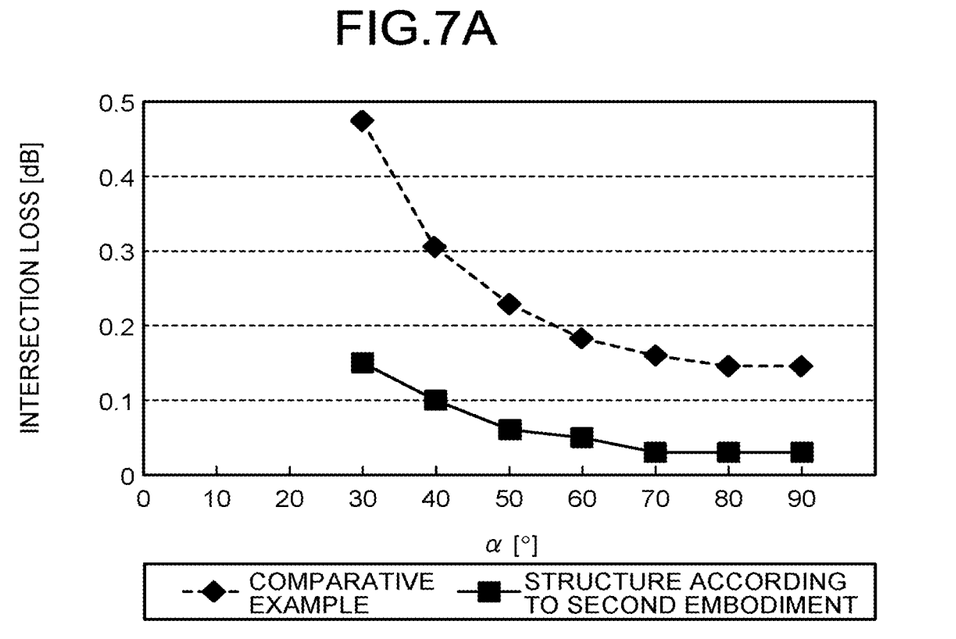
FIG. 7A is a diagram illustrating the relationship between an intersection angle α and the intersection loss.
Figure 7B:
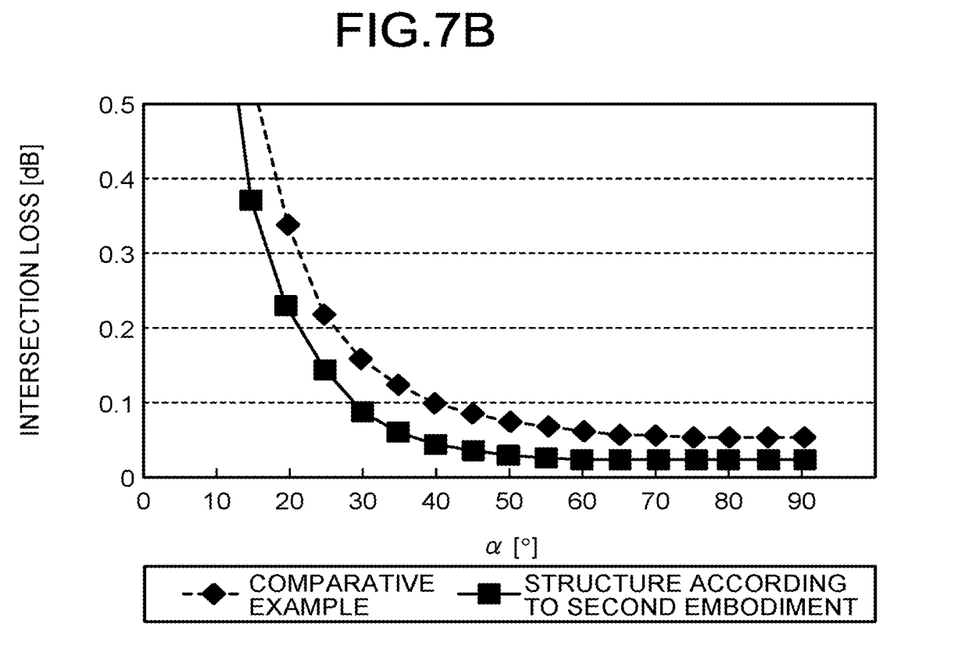
FIG. 7B is another diagram illustrating the relationship between an intersection angle α and the intersection loss.

FIGS. 7A and 7B are a diagram illustrating the relationship between the intersection angle α and the intersection loss. In FIG. 7A is illustrated the case in which the relative refractive index difference Δ is equal to 5%, and in FIG. 7B is illustrated the case in which the relative refractive index difference Δ is equal to 1.55%. As illustrated, in the case in which the relative refractive index difference Δ is equal to 5% (FIG. 7A) as well as the case in which the relative refractive index difference Δ is equal to 1.55% (FIG. 7B), the structure according to the second embodiment enables achieving the effect of reducing the intersection loss as compared to the structure according to the comparative example. It was confirmed that the effect is more evident particularly in proportion to the relative refractive index difference Δ and in inverse proportion to the intersection angle α.

Third Embodiment

Figure 8:
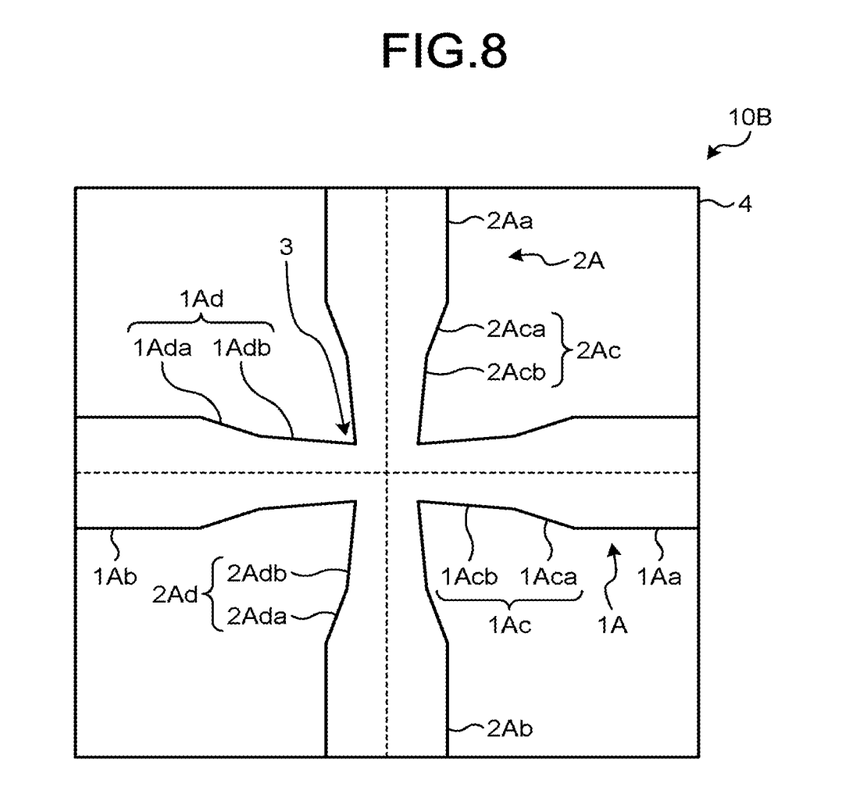
FIG. 8 is a schematic diagram illustrating a cross optical waveguide structure according to a third embodiment.

FIG. 8 is a schematic diagram illustrating a cross optical waveguide structure according to a third embodiment. A cross optical waveguide structure 10B according to the third embodiment includes a first optical waveguide 1A; a second optical waveguide 2A that is positioned in the same plane as the first optical waveguide 1A and that is orthogonal to the first optical waveguide 1A; the intersection portion 3 of intersection between the first optical waveguide 1A and the second optical waveguide 2A; and the cladding portion 4 that is formed on the outer periphery of the first optical waveguide 1A and the second optical waveguide 2A.

The first optical waveguide 1A and the second optical waveguide 2A are made of silica based glass that includes a dopant for enhancing the refractive index, such as $GeO_2$ or fine-grained $ZrO_2$, and have a higher refractive index than the cladding portion 4. In the third embodiment, the first optical waveguide 1A, the second optical waveguide 2A, and the intersection portion 3 have the same relative refractive index difference Δ at the wavelength of 1.55 μm.

The first optical waveguide 1A includes a first fixed-width portion 1Aa, a second fixed-width portion 1Ab, a first tapering portion 1Ac, and a second tapering portion 1Ad. The first fixed-width portion 1Aa and the second fixed-width portion 1Ab have a fixed width in the longitudinal direction. In the third embodiment, the first fixed-width portion 1Aa and the second fixed-width portion 1Ab have the same width set to enable propagation, in the single mode, of the light having the wavelength of 1.55 μm.

The first tapering portion 1Ac extends from the first fixed-width portion 1Aa toward the second fixed-width portion 1Ab, and has a tapering shape with the width thereof decreasing toward the second fixed-width portion 1Ab. The first tapering portion 1Ac is linked to the intersection portion 3. However, the first tapering portion 1Ac includes tapering portions 1Aca and 1Acb unlike the first tapering portion 1c in the cross optical waveguide structure 10 according to the first embodiment. The tapering portion 1Aca is linked to the first fixed-width portion 1Aa, and the tapering portion 1Acb is linked to the intersection portion 3. The tapering portion 1Aca has a greater tapering angle than the tapering portion 1Acb. That is, the first tapering portion 1Ac has a two-step tapering structure in which the tapering angle changes in two steps.

Similarly, the second tapering portion 1Ad also includes a tapering portion 1Ada, which is linked to the second fixed-width portion 1Ab, and a tapering portion 1Adb, which is linked to the intersection portion 3. The tapering portion 1Ada has a greater tapering angle than the tapering portion 1Adb. That is, the second tapering portion 1Ad has a two-step tapering structure.

Similarly, the second optical waveguide 2A includes a third fixed-width portion 2Aa, a fourth fixed-width portion 2Ab, a third tapering portion 2Ac, and a fourth tapering portion 2Ad. The third fixed-width portion 2Aa and the fourth fixed-width portion 2Ab have a fixed width in the longitudinal direction. In the third embodiment, the third fixed-width portion 2Aa and the fourth fixed-width portion 2Ab have the same width as the width of the first fixed-width portion 1Aa.

The third tapering portion 2Ac extends from the third fixed-width portion 2Aa toward the fourth fixed-width portion 2Ab, and has a tapering shape with the width thereof decreasing toward the fourth fixed-width portion 2Ab. The third tapering portion 2Ac is linked to the intersection portion 3. Moreover, the third tapering portion 2Ac includes a tapering portion 2Aca, which is linked to the third fixed-width portion 2Aa, and a tapering portion 2Acb, which is linked to the intersection portion 3. The tapering portion 2Aca has a greater tapering angle than the tapering portion 2Acb. That is, the third tapering portion 2Ac has a two-step tapering structure.

Similarly, the fourth tapering portion 2Ad also includes a tapering portion 2Ada, which is linked to the fourth fixed-width portion 2Ab, and a tapering portion 2Adb, which is linked to the intersection portion 3. The tapering portion 2Ada has a greater tapering angle than the tapering portion 2Adb. That is, the fourth tapering portion 2Ad has a two-step tapering structure.

In the cross optical waveguide structure 10B, the first tapering portion 1Ac, the second tapering portion 1Ad, the third tapering portion 2Ac, and the fourth tapering portion 2Ad are set to have shapes such that the mode field radius of propagation mode of the light input to the first fixed-width portion 1Aa, the second fixed-width portion 1Ab, or the third fixed-width portion 2Aa, and the fourth fixed-width portion 2Ab is reduced by the first tapering portion 1Ac, the second tapering portion 1Ad, the third tapering portion 2Ac, and the fourth tapering portion 2Ad, respectively, and the light is collected in the intersection portion 3. As a result, in an identical manner to the first and second embodiments, the intersection loss in the intersection portion 3 is reduced.

Meanwhile, in the third embodiment, the first tapering portion 1Ac, the second tapering portion 1Ad, the third tapering portion 2Ac, and the fourth tapering portion 2Ad have two-step tapering structures. However, the present disclosure is not limited to that case, and the tapering portions can have multi-step structures of three or more steps.

Fourth Embodiment

Figure 9:
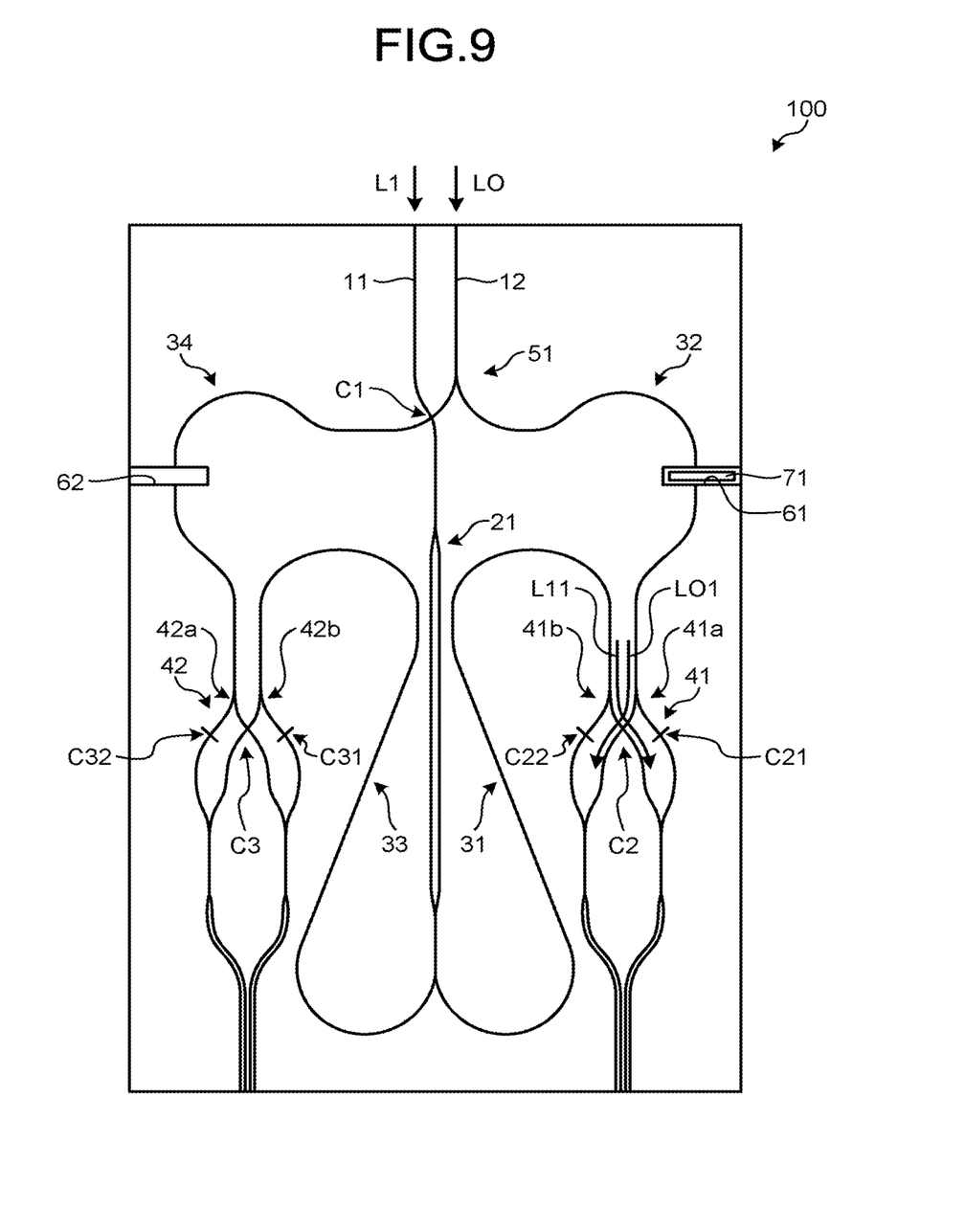
FIG. 9 is a schematic diagram of an optical waveguide device according to a fourth embodiment.

The cross optical waveguide structure according to the embodiments of the present disclosure can be implemented in various optical waveguide devices. FIG. 9 is a schematic diagram of an optical waveguide device according to a fourth embodiment. An optical waveguide device 100 is configured under the assumption of being used as a coherent mixer implemented in a demodulator of the DP-QPSK modulation technique.

More particularly, the optical waveguide device 100 includes input optical waveguides 11 and 12; a polarized wave branching filter 21; connecting type optical waveguides 31, 32, 33 and 34; 90° hybrid devices 41 and 42; a Y-branch optical waveguide 51; slits 61 and 62; and a half-wave plate 71.

The input optical waveguide 11, to which the light L1 is input as the signal light, is linked to the polarized wave branching filter 21 via an S-shaped curved portion formed by a combination of two curved portions having the curvature of opposite polarities, having the same radius of curvature, and having the same arc. The input optical waveguide 12, to which a local oscillation light LO is input, is linked to the Y-branch optical waveguide 51 in a substantially linear manner.

The polarized wave branching filter 21 includes a Y-branch optical waveguide, a direction coupler, and two arm optical waveguides that connect the Y-branch optical waveguide and the directional coupler; and has a configuration of a Mach-Zehnder Interferometer (MZI). The connecting type optical waveguides 31 and 33 are optical paths for connecting the optical paths of the light rays, which are branched by the polarized wave branching filter 21, to the 90° hybrid devices 41 and 42, respectively.

The Y-branch optical waveguide branches the local oscillation light LO, into the connecting type optical waveguides 32 and 34 at the branching ratio of 1:1. The connecting type optical waveguides 32 and 34 are optical paths for connecting the optical paths of the light rays, which are branched by the Y-branch optical waveguide, to the 90° hybrid devices 41 and 42, respectively.

The 90° hybrid devices 41 and 42 are a type of interference circuits that branch the input light L1 and the local oscillation light LO, respectively; apply a phase difference of 90° as the relative phase difference of optical waves to the branched local oscillation lights LO; and then mix one branched light L1 with one branched local oscillation light LO as well as mix the other branched light L1 with the other branched local oscillation light LO.

In the connecting type optical waveguide 32 from the Y-branch optical waveguide 51 to the 90° hybrid device 41, the slit 61 is formed in which the half-wave plate 71 is inserted. The optical axis of the half-wave plate 71 is adjusted to form an angle of 45° with the axis of polarization of the connecting type optical waveguide 32. Hence, the local oscillation light LO passing through the half-wave plate 71 is subjected to a 90° rotation of the polarized waves before being input to the 90° hybrid device 41.

In the connecting type optical waveguide 34 from the Y-branch optical waveguide 51 to the 90° hybrid device 42, the slit 62 is formed but without having any half-wave plate 71 inserted therein. Hence, in the 90° hybrid device 42, the local oscillation light LO is input with no change in the polarized waves. The slit 62 is provided as an element for causing a loss that is meant for balancing the loss occurring due to the slit 61 and the half-wave plate 71 in the connecting type optical waveguide 32.

Moreover, at the position of intersection of the input optical waveguide 11 and the connecting type optical waveguide 34, a cross optical waveguide structure C1 is disposed that has an identical structure to the cross optical waveguide structure 10A according to the second embodiment. That leads to a reduction in the loss occurring at the time when the light L1 propagating through the input optical waveguide 11 and the branched local oscillation light LO propagating through the connecting type optical waveguide 34 pass through the cross optical waveguide structure C1.

The 90° hybrid devices 41 and 42 also include cross optical waveguide structures C2 and C3, respectively, which have an identical structure to the cross optical waveguide structure 10A. Moreover, the 90° hybrid device 41 further includes cross optical waveguide structures C21 and C22 having an identical structure to the cross optical waveguide structure C2. Similarly, the 90° hybrid device 42 further includes cross optical waveguide structures C31 and C32 having an identical structure to the cross optical waveguide structure C3.

In the cross optical waveguide structure C2, there occurs intersection of one of the optical waveguides branched from each of bifurcating portions 41a and 41b of the 90° hybrid device 41. The cross optical waveguide structures C21 and C22 are disposed in the other optical waveguides branched from the bifurcating portions 41a and 41b, respectively. In the cross optical waveguide structure C3, there occurs intersection of one of the optical waveguides branched from each of bifurcating portions 42a and 42b of the 90° hybrid device 42. The cross optical waveguide structures C31 and C32 are disposed in the other optical waveguides branched from the bifurcating portions 42a and 42b, respectively.

The cross optical waveguide structures C21 and C22 are provided for the following reason. When the cross optical waveguide structure C2 having an identical structure to the cross optical waveguide structure 10A is implemented in the 90° hybrid device 41, there occurs phase variation in the cross optical waveguide structure C2. That is, regarding the path of a local oscillation light LO1 that passes through the cross optical waveguide structure C2 from the connecting type optical waveguide 32 via the bifurcating portion 41a and regarding the path of a light L11 that passes through the cross optical waveguide structure C2 from the connecting type optical waveguide 31 via the bifurcating portion 41b, the phase difference between the two paths should be essentially set to 90°. However, the phase undergoes a shift as a result of the passage through the cross optical waveguide structure C2. For example, with respect to the intersecting optical waveguides and the cladding portion of the intersection portion in the cross optical waveguide structure C2, when the relative refractive index difference is equal to 5%; there are cases where the phase changes by 30° and the phase difference becomes equal to 60°.

In that regard, in the 90° hybrid device 41, along with providing the cross optical waveguide structure C2, the cross optical waveguide structures C21 and C22 having an identical structure to the cross optical waveguide structure C2 are also provided, so that the phase difference between the two paths can be set to 90°. Similarly, in the 90° hybrid device 42, along with providing the cross optical waveguide structure C3, the cross optical waveguide structures C31 and C32 having an identical structure to the cross optical waveguide structure C3 are also provided, so that the phase difference between the two paths can be set to 90°.

Fifth Embodiment

Figure 10:
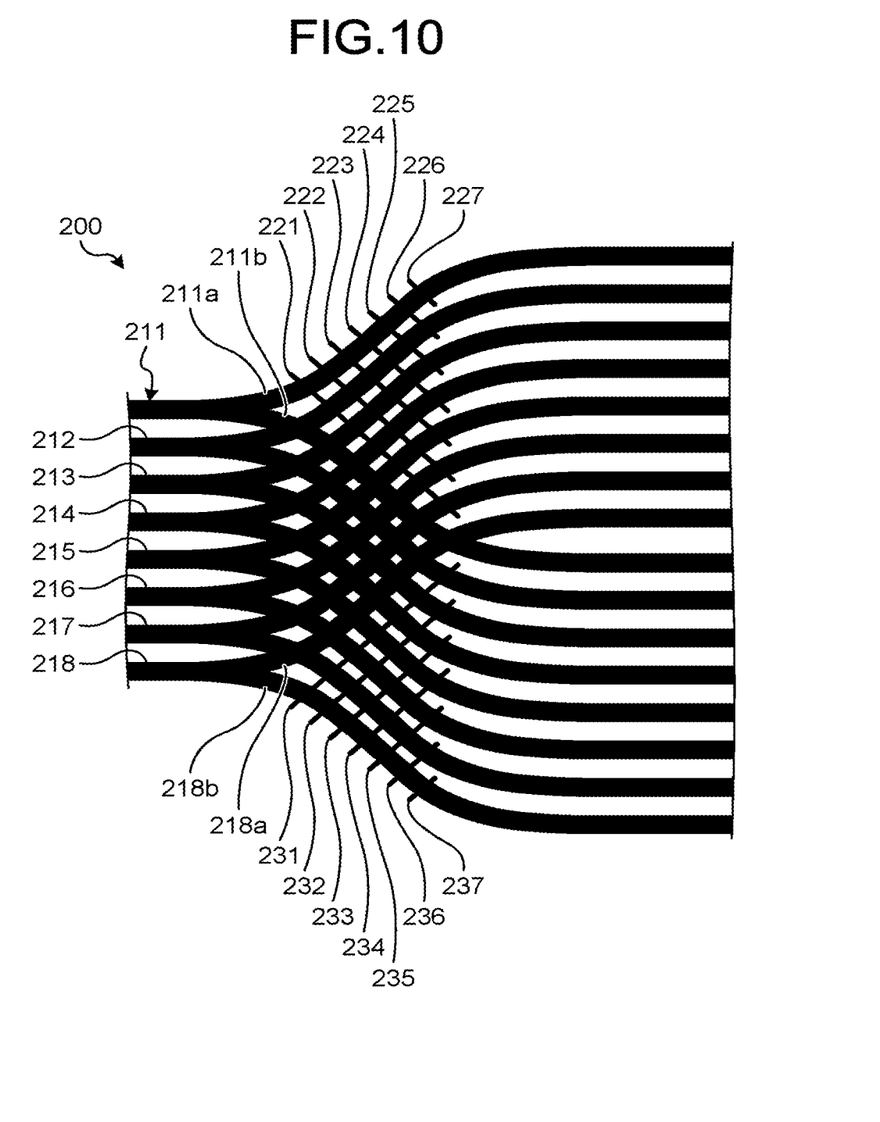
FIG. 10 is a schematic diagram of an optical waveguide device according to a fifth embodiment.

FIG. 10 is a schematic diagram illustrating an optical waveguide device according to a fifth embodiment. An optical waveguide device 200 can be implemented also in the multicast switch disclosed in "Development of Multicast Switch based on $ZrO_2$—$SiO_2$ High Δ PLC" by Masanori Takahashi, Shintaro Yamasaki, Yasuyoshi Uchida, and Junichi Hasegawa in Furukawa Denko Company Times, Vol. 135, (February 2016), pp. 20-24 (in Japanese); and at least includes a structure in which eight 1×2 splitters 211, 212, 213, 214, 215, 216, 217, and 218 configured using an optical waveguide are arranged in an array shape.

The 1×2 splitter 211 is a 1×2 optical coupler such as a multi-mode interferometer (MMI), and is branched into two branched optical waveguides 211a and 211b. The 1×2 splitter 218 is also a 1×2 optical coupler such as a multi-mode interferometer (MMI), and is branched into two branched optical waveguides 218a and 218b. The other 1×2 splitters 212 to 216 are also branched into two branched optical waveguides.

The branched optical waveguides other than the branched optical waveguides 211a and 218b intersect with other branched optical waveguides. For example, the branched optical waveguides 211b and 218a intersect with seven other branched optical waveguides. At the positions of intersection of those two branched optical waveguides, cross optical waveguide structures having an identical structure to the cross optical waveguide structure 10A are provided. That leads to a reduction in the loss at the time when each branched optical waveguide passes through the corresponding cross optical waveguide structure.

Moreover, the optical waveguide device 200 includes cross optical waveguides 221 to 227 and cross optical waveguides 231 to 237, each of which intersects with one of the eight 1×2 splitters 211 to 218.

The cross optical waveguides 221 to 227 and the cross optical waveguides 231 to 237 function to ensure that each branched optical waveguide has equal number of positions of intersection as other optical waveguides (branched optical waveguides or cross optical waveguides). More particularly, for example, since the branched optical waveguide 211b intersects with seven branched optical waveguides, there are seven positions of intersection. On the other hand, the branched optical waveguide 211a does not intersect with any other branched optical waveguide, but intersects with seven cross optical waveguides 221 to 227. Hence, seven positions of intersection are formed for intersection with other optical waveguides. As a result, regarding the guided light in the branched optical waveguides 211a and 211b, the phase difference decreases thereby enabling achieving reduction in the loss dependent on the polarized waves attributed to the optical phase difference.

Similarly, regarding each other branched optical waveguide, there are seven positions of intersection with other optical waveguides as a result of providing the cross optical waveguides 221 to 227 and the cross optical waveguides 231 to 237. That leads to a reduction in the optical phase difference and a reduction in the loss dependent on the polarized waves attributed to the optical phase difference. It is further desirable if the cross optical waveguide structure at each position of intersection between two branched optical waveguides is identical to the cross optical waveguide structure at each position of intersection between a branched optical waveguide and a cross optical waveguide, so that there is almost no occurrence of optical phase difference and no occurrence of loss dependent on the polarized waves attributed to the optical phase difference.

Meanwhile, in the embodiments described above, the tapering shape of the first tapering portion, the second tapering portion, the third tapering portion, and the tapering portion is such that the outer edge of the waveguide is linear while the width decreases. However, alternatively, the tapering shape can be such that the outer edge of the waveguide is curved while the width decreases. When the outer edge of a waveguide is curved, it is desirable to have such a curve that the angle formed by the outer edge and the optical axis is large in the fixed-width portion and is small in the intersection portion. That is, it is desirable to have such a curve that the outer edge is bulging on the inside with respect to the optical axis. As a result, the intersection angle can be increased without causing physical interference between the intersecting waveguides.

Moreover, in the embodiments described above, the first optical waveguide, the second optical waveguide, the intersection portion, and the cladding portion are made of silica base glass. However, the present disclosure is not limited to that example. Alternatively, the first optical waveguide, the second optical waveguide, the intersection portion, and the cladding portion can also be implemented in a cross optical waveguide structure made of some other dielectric material or semiconductor material.

Furthermore, although the cross optical waveguide structure and the optical waveguide device according to the embodiments described above are made of silica based glass, the present disclosure can be implemented also in a cross optical waveguide structure in an optical waveguide made of a silicon wire optical waveguide or an Indium Phosphide (InP) semiconductor material.

According to the present disclosure, it becomes possible to implement a cross optical waveguide structure in which the intersection loss is reduced.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A cross optical waveguide structure comprising:
a first optical waveguide;
a second optical waveguide that is positioned in a same plane as the first optical waveguide;
an intersection portion of intersection between the first optical waveguide and the second optical waveguide; and
a cladding portion that is formed on outer periphery of the first optical waveguide and the second optical waveguide, and that has a smaller refractive index than the first optical waveguide, the second optical waveguide, and the intersection portion, wherein
the first optical waveguide includes
a first fixed-width portion,
a second fixed-width portion,
a first tapering portion that extends from the first fixed-width portion toward the second fixed-width portion, and a width thereof decreases toward the second fixed-width portion, and
a second tapering portion that extends from the second fixed-width portion toward the first fixed-width portion, and a width thereof decreases toward the first fixed-width portion,
the second optical waveguide includes
a third fixed-width portion,
a fourth fixed-width portion,
a third tapering portion that extends from the third fixed-width portion toward the fourth fixed-width portion, and a width thereof decreases toward the fourth fixed-width portion, and
a fourth tapering portion that extends from the fourth fixed-width portion toward the third fixed-width portion, and a width thereof decreases toward the third fixed-width portion,
the intersection portion is linked to the first tapering portion, the second tapering portion, the third tapering portion, and the fourth tapering portion, and
the first tapering portion, the second tapering portion, the third tapering portion, and the fourth tapering portion are set to have a tapering shape such that a mode field radius of propagation mode of light input to the first fixed-width portion, the second fixed-width portion, the third fixed-width portion, and the fourth fixed-width portion is reduced by the first tapering portion, the second tapering portion, the third tapering portion, the fourth tapering portion, respectively, and the light is collected in the intersection portion, wherein
each of the first to fourth tapering portions includes two different tapering portions, and among the two different tapering portions of each of the first to fourth tapering portions, a tapering angle of one tapering portion closer to the respective fixed-width portion is greater than that of the other tapering portion, wherein
the tapering shape of each of the first tapering portion, the second tapering portion, the third tapering portion, and the fourth tapering portion is set in such way that the mode field radius of the propagation mode changes in a non-adiabatic manner, wherein
Equation (1) to Equation (4) given below are satisfied:

$$0.5 \times \Delta \leq \theta_1 \leq 3 \times \Delta \tag{1}$$

$$0.5 \times \Delta \leq \theta_2 \leq 3 \times \Delta \tag{2}$$

$$0.5 \times \Delta \leq \theta_3 \leq 3 \times \Delta \tag{3}$$

$$0.5 \times \Delta \leq \theta_4 \leq 3 \times \Delta \tag{4}$$

wherein $\theta_1$, $\theta_2$, $\theta_3$, and $\theta_4$ represent tapering angles of the first tapering portion, the second tapering portion, the third tapering portion, and the fourth tapering portion, respectively, and
wherein $\Delta$ represents relative refractive index difference of the first tapering portion, the second tapering portion, the third tapering portion, the fourth tapering portion, and the intersection portion with respect to the cladding portion.

2. The cross optical waveguide structure according to claim 1, wherein Equation (5) to Equation (8) given below are satisfied:

$$0.7 \times \Delta \leq \theta_1 \leq 1.8 \times \Delta \tag{5}$$

$$0.7 \times \Delta \leq \theta_2 \leq 1.8 \times \Delta \tag{6}$$

$$0.7 \times \Delta \leq \theta_3 \leq 1.8 \times \Delta \tag{7}$$

$$0.7 \times \Delta \leq \theta_4 \leq 1.8 \times \Delta \tag{8}$$

3. The cross optical waveguide structure according to claim 1, wherein the first optical waveguide, the second optical waveguide, the intersection portion, and the cladding portion are made of silica based glass.

4. The cross optical waveguide structure according to claim 1, wherein the second optical waveguide is inclined with respect to the first optical waveguide.

5. An optical waveguide device comprising the cross optical waveguide structure according to claim 1.

* * * * *